US007082229B2

United States Patent
Galtarossa et al.

(10) Patent No.: US 7,082,229 B2
(45) Date of Patent: Jul. 25, 2006

(54) OPTICAL COMMUNICATION SYSTEM AND APPARATUS FOR COMPENSATION OR EMULATION OF PMD EFFECTS

(75) Inventors: Andrea Galtarossa, Padua (IT); Giuseppe Lorenzetto, Urbana (IT); Luca Palmieri, Padua (IT); Marco Santagiustina, Venice (IT); Raoul Fiorone, Genoa (IT); Andrea Corti, Cantu' (IT)

(73) Assignee: Marconi Communications SpA, Genoa (IT)

( * ) Notice: Subject to any disclaimer, the term of this patent is extended or adjusted under 35 U.S.C. 154(b) by 34 days.

(21) Appl. No.: 10/469,809

(22) PCT Filed: Feb. 28, 2002

(86) PCT No.: PCT/IB02/01600

§ 371 (c)(1),
(2), (4) Date: Mar. 31, 2004

(87) PCT Pub. No.: WO02/071661

PCT Pub. Date: Sep. 12, 2002

(65) Prior Publication Data

US 2004/0146234 A1    Jul. 29, 2004

(30) Foreign Application Priority Data

Mar. 2, 2001    (IT) .......................... MI2001A0442

(51) Int. Cl.
*G02B 6/00*    (2006.01)
(52) U.S. Cl. .............................. 385/11; 385/27; 385/28
(58) Field of Classification Search .................. 383/11, 383/27, 28
See application file for complete search history.

(56) References Cited

U.S. PATENT DOCUMENTS

| 5,227,623 | A  | * | 7/1993  | Heffner ....................... 356/364 |
| 6,724,469 | B1 | * | 4/2004  | Leblanc ..................... 356/73.1 |
| 2001/0024538 | A1 | * | 9/2001  | Khosravani et al. .......... 385/11 |
| 2001/0055437 | A1 | * | 12/2001 | Khosravani et al. .......... 385/11 |
| 2003/0076588 | A1 | * | 4/2003  | Savory et al. ............... 359/498 |
| 2003/0161568 | A1 | * | 8/2003  | El-Refaei et al. ............. 385/11 |
| 2004/0096140 | A1 | * | 5/2004  | Zeng ........................... 385/11 |

FOREIGN PATENT DOCUMENTS

DE    198 16 178 A1    10/1999
EP    0 909 045 A2    4/1999

(Continued)

OTHER PUBLICATIONS

Sandel D., et al., *Automatic Polarisation Mode Dispersion Copensation in 40GBIT/S Optical Transmission System*, Electronic Letters, IEE Stevenage, GB, Vo.. 34, No. 23, Nov. 12, 1998, pp. 2258-2259.

(Continued)

*Primary Examiner*—Frank G. Font
*Assistant Examiner*—James P. Hughes
(74) *Attorney, Agent, or Firm*—Kirschstein, et al.

(57) ABSTRACT

An apparatus for compensation or emulation of polarization mode dispersion (PMD) effects occurring in an optical signal traveling over an optical fiber based link comprises controllable birefringence sections and devices for polarization conversion. Each section comprises birefringence optical members or parts thereof, and each section is followed or preceded by one of the controllable devices for polarization conversion. The birefringence sections are at least three in number, and at least one of these has a propagation delay different from that of the other sections. The apparatus comprises a detection device for PMD output and control of the controllable devices for feedback adjustment.

16 Claims, 1 Drawing Sheet

FOREIGN PATENT DOCUMENTS

WO          WO 01/48957 A1    10/2000

OTHER PUBLICATIONS

Figure 1:
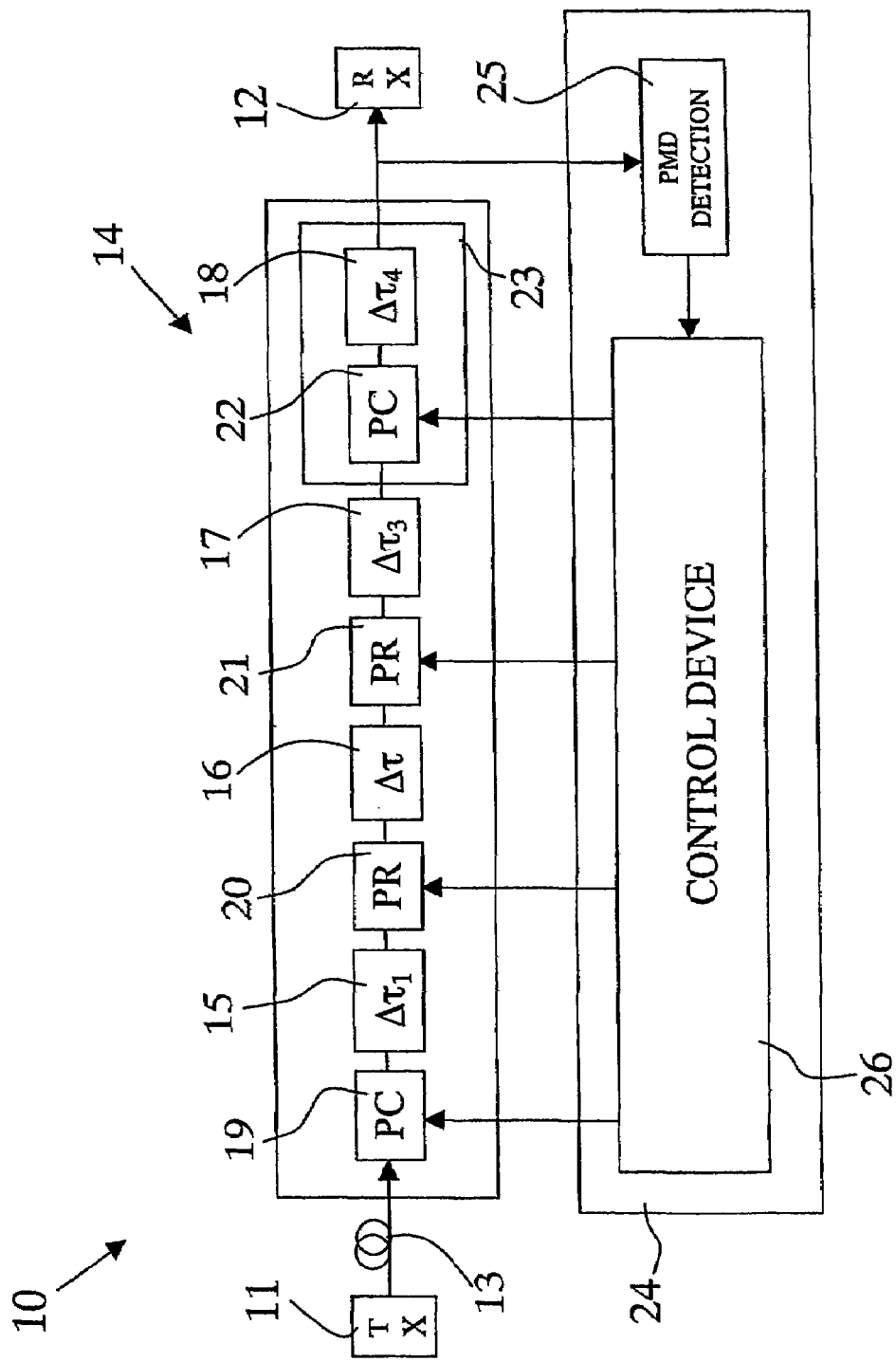

Noe, R., et al., *Polarization Mode Dispersion Compensation at 10, 20, and 40 BG/S With Various Optical Equalizers*, Journal of Lightwave Technology, IEEE, New York, US, vol. 17, No. 9, Sep. 1999, pp. 1602-1616.

Noe, R., et al., *Polarization Mode Dispersion Compensation at 20 GB/S With Fiber-Based Distributed Equalizer*, Internet Search for "DGD and PSP", Nov. 13, 2000, pp. 1-2.

* cited by examiner

OPTICAL COMMUNICATION SYSTEM AND APPARATUS FOR COMPENSATION OR EMULATION OF PMD EFFECTS

The present invention relates to an apparatus for compensation or emulation of the effects of polarization mode dispersion (PMD) which occur when an optical signal travels inside an optical fiber based link. The present invention also relates to a system of transmission with this apparatus.

PMD causes a differential unit delay between the two polarization states (first order) and distortion of the part of the signal on each polarization state. The combined effect of this is to make the optical signal distorted and dispersed. The different time delays between the various components of the signal in the various polarization states are gaining ever more importance with the increase in transmission speeds. In modern optical fiber transmission systems at ever higher FIGURE frequencies (10 Gbit/s and more) effective compensation for PMD effects becomes necessary and fundamental.

The prior art has proposed PMD compensation devices to improve the quality of optical transmissions. These devices are produced with cascades of birefringence members and polarization rotators and controllers. But known systems are not entirely satisfactory because of the speed of reaction to PMD changes with dynamic compensation and the quality of the compensation obtainable.

It was also found necessary to have PMD emulation systems for control, verification and experimentation.

The general purpose of the present invention is to remedy the above mentioned shortcomings by making available a transmission system and an apparatus with improved static and dynamic compensation characteristics or emulation of the PMD effects occurring in an optical signal traveling over an optical fiber based link.

In view of this purpose it was sought to provide in accordance with the present invention an apparatus for compensation or emulation of PMD effects occurring in an optical signal traveling over an optical fiber based link comprising birefringence sections and controllable devices for polarization transformation with each section comprising birefringence optical members or parts thereof and each section being followed or preceded by one of said controllable polarization transformation devices characterized in that the birefringence sections are at least three in number and that at least one of said sections has a propagation delay different from that of the other sections.

To clarify the explanation of the innovative principles of the present invention and its advantages compared with the prior art there is described below with the aid of the annexed drawing a possible embodiment thereof by way of non-limiting example applying said principles.

With reference to the FIGURE there is shown diagrammatically an optical fiber communication system designated as a whole by reference number 10 comprising a transmitting sywhich sends signals to a receiving system 12 over an optical fiber based link 13 and an apparatus 14 to compensate or emulate the PMD effects which occur on the optical signal traveling over the above link.

The apparatus 14 comprises in turn birefringence sections 15–18 and controllable devices 19–22 for polarization conversion. The structure of the birefringence sections and individual controlled devices is basically prior art and is not further described nor shown.

Each section comprises birefringence optical members or parts thereof for creating predetermined propagation delays or Differential Group Delays (DGD). These members can be created by various known techniques such as the use of optical fibers for polarization maintenance, liquid crystals, birefringence crystals, semiconductor ceramic materials, photonic crystal devices, MEMS devices and the like.

Each birefringence section is followed or preceded by one of said controllable polarization transformation devices. The polarization conversion devices comprise known polarization controllers PC and polarization rotators PR and can be created by various known methods including electro-optical members, magneto-optical members, liquid crystals, mechanical actuators, twisted or pressed optical fibers, thermo-optical members, MEMS semiconductor devices and the like.

The birefringence sections are at least three in number and at least one of said sections has a propagation delay different from that of the other sections. Advantageously each section has a delay different from that of the others and the sections are arranged in series in order of decreasing delay in the direction of signal propagation.

It has been found very advantageous that two sections have delays around $T_c$ and $\alpha T_c$ respectively and the remaining sections have total delay around $(1-\alpha)T_c$ with $0<\alpha<1$ and advantageously between $0.5<\alpha<0.7$ and with $T_c$ such that $$\frac{\overline{DGD}}{4} \leq T_c \leq 2\overline{DGD}$$

where $\overline{DGD}$ is the average PMD differential delay time to be compensated or emulated.

With only three sections we accordingly will have $\tau_1=T_c$, $\tau_2=\alpha T_c$, $\tau_3=(1-\alpha)T_c$.

As may be seen in the FIG a first section 15 is preceded by a polarization controller 19, the second section 16 is preceded by a polarization rotator 20 and the third section 17 is preceded by another polarization rotator 21.

It was surprisingly found that with the above mentioned structure it is possible to obtain more satisfactory PMD control, fast and accurate, with considerable improvement in the performance of the optical fiber based communication system.

For further improvement of the apparatus' performance it was found advantageously to employ an additional stage 23 made up of a fourth birefringence section 18 preceded by another polarization controller 22.

To keep at around $(1-\alpha)T_c$ the total amount of delay produced on the signal by the third and fourth sections we have $\tau_3=\beta(1-\alpha)T_c$ and $\tau_4=(1-\beta)(1-\alpha)T_c$ with $0<\beta<1$. It was found advantageous that $\beta$ be between 0.5 and 0.95 and preferably around 0.9.

This way the stage 23 permits performing fine and very fast adjustments with no need of changing the settings of the other sections.

As may be seen in FIG. 1, to have an automatic PMD adjustment system the apparatus comprises a device 24 for PMD output detection and control of the controllable devices for polarization conversion.

The detection and control device 24 has a PMD detector 25 and a control device 26. The detector 25 receives at input all or part or the signal output from the apparatus 14 and calculates PMD indicating parameters by known methods not described here. The detector sends the calculated parameters to the control device 26 and on the basis of the received parameters the control device 26 sends control signals for feedback adjustment of the controllable devices 19–22 to keep the detected PMD below a predetermined amount.

Advantageously when the apparatus 14 comprises an output stage 23 as described above, the detection and control device 24 prefers adjustment of the polarization controller 22 which precedes the fourth section 18. In other words the control device sends control signals to change adjustment of polarization controller 22 only when PMD increases over the predetermined amount by an amount within the adjustment range of said polarization controller 22 and of the fourth birefringence section in general. This way adjustment is very fast and can be used to hold the PMD within the values defined as acceptable even when there are fast PMD changes along the line.

Let B be the working band and the maximum differential delay it is desired to compensate or emulate being given, as another advantageous feature of the apparatus in accordance with the present invention the sizing of the various members can be done in such a manner that the sections will each have a delay such that by appropriately regulating said controllable polarization transformation devices it is possible to obtain the following relationship on all the frequencies within B band i.e. there is at least one adjustment condition for the controllable devices such that the following relationship prevails.

$$DGD \cdot B = \epsilon$$

where

DGD is the assumed differential delay from the device apparatus 14,

B is the band on which the apparatus operates, and $\epsilon$ is a constant expressed in radians so that $0 \leq \epsilon \leq 2.5$.

In this manner the apparatus can be adjusted to shut off, advantageously setting $\epsilon=0$, so that in OFF condition the compensator has minimal effect in the circuit. Again advantageously the above relationship can be the device rest position.

It is now clear that the predetermined purposes have been achieved by making available an apparatus for PMD compensation or emulation having high performance with low complexity both structurally and operationally. Indeed, it should be considered that calculation of PMD and feedback control of devices such as polarization rotators and controllers is quite costly from the computational viewpoint. With regard to prior art compensators, the structure in accordance with the present invention makes it possible to keep computational complexity low and at the same time obtain high performance. The communication system in accordance with the present invention thus has high performance even at high FIGURE frequencies, for example above 30 to 40 Gbit/s.

Naturally the above description of an embodiment applying the innovative principles of the present invention is given by way of non-limiting example of said principles within the scope of the exclusive right claimed here.

The invention claimed is:

1. An apparatus for compensating or emulating polarization mode dispersion (PMD) effects occurring in an optical signal traveling over an optical fiber based link, comprising: birefringence sections, controllable polarization transformation devices, each birefringence section including birefringence optical members or parts thereof, each birefringence section being followed or preceded by one of the controllable polarization transformation devices, the birefringence sections being at least three in number, at least one of the birefringence sections having a propagation delay time different from that of the other birefringence sections, and two of the birefringence sections having propagation delay times of around $T_c$ and $\alpha T_c$ respectively, and the remaining birefringence sections having a total propagation delay time of around $(1-\alpha) T_c$ with $T_c$ such that $$\frac{\overline{DGD}}{4} \leq T_c \leq 2\overline{DGD}$$

where $\overline{DGD}$ is an average differential group propagation time of the PMD to be compensated or emulated and with $0<\alpha<1$.

2. The apparatus in accordance with claim 1, characterized in that each birefringence section has a propagation delay time different from that of the other birefringence sections.

3. The apparatus in accordance with claim 1, characterized in that the birefringence sections are arranged in series by decreasing order of the propagation delay time in a direction of propagation of the signals over the birefringence sections.

4. The apparatus in accordance with claim 1, characterized in that $0.5<\alpha<0.7$.

5. The apparatus in accordance with claim 1, characterized in that the devices are at least one polarization controller and two polarization rotators.

6. The apparatus in accordance with claim 5, characterized in that a first of the birefringence sections is preceded by the polarization controller, and a second of the sections is preceded by one of the two rotators, and a third of the birefringence sections is preceded by the other of the two rotators.

7. The apparatus in accordance with claim 6, characterized in that a fourth of the birefringence sections is preceded by another polarization controller.

8. The apparatus in accordance with claim 7, characterized in that the third and the fourth birefringence sections have propagation delay times of $\beta(1-\alpha) T_c$ and $(1-\beta)(1-\alpha) T_c$ respectively with $0<\alpha<1$, and with $0<\alpha<1$.

9. The apparatus in accordance with claim 8, characterized in that $0.5<\alpha<0.7$.

10. The apparatus in accordance with claim 8, characterized in that $\beta$ is between 0.5 and 0.95.

11. The apparatus in accordance with claim 10, characterized in that $\beta$ is around 0.9.

12. The apparatus in accordance with claim 1, characterized in that each birefringence section has a propagation delay time such that there is at least one condition of adjustment of the devices for which $DGD \cdot \beta = \epsilon$ on all frequencies within a bandwidth on which the apparatus is made to operate, with DGD equal to a differential delay time assumed by the apparatus, and with $\epsilon$ expressed in radians such that $0 \leq \epsilon \leq 2.5$ and $0<\beta 1$.

13. The apparatus in accordance with claim 12, characterized in that $\epsilon$ is zero.

14. The apparatus in accordance with claim 7, and comprising a detection and control device for detecting output PMD and controlling the controllable polarization transformation devices, the detection and control device receiving at an input a signal output from the apparatus, and sending feedback adjustment control signals for the controllable polarization transformation devices to keep the detected output PMD below a predetermined amount.

15. The apparatus in accordance with claim 14, characterized in that the detection and control device privileges adjustment of the other polarization controller which precedes the fourth birefringence section in such a manner as to send control signals to change only the adjustment of the other polarization controller when the detected output PMD increases more than the predetermined amount by an amount falling within adjustment range of the other polarization controller and of the fourth birefringence section.

16. An optical communication system using an apparatus for compensating or emulating polarization mode dispersion (PMD) effects occurring in an optical signal traveling over an optical fiber based link, the apparatus comprising: birefringence sections, controllable polarization transformation devices, each birefringence section including bi refringence optical members or parts thereof, each birefringence section being followed or preceded by one of the controllable polarization transformation devices, the birefringence sections being at least three in number, at least one of the birefringence sections having a propagation delay time different from that of the other birefringence sections, and two of the birefringence sections having propagation delay times of around $T_c$ and $\alpha T_c$ respectively, and the remaining birefringence sections having a total propagation delay time of around $(1-\alpha) T_c$ with $T_c$ such that $$\frac{\overline{DGD}}{4} \le T_c \le 2\overline{DGD}$$

where $\overline{DGD}$ is an average differential group propagation time of the PMD to be compensated or emulated and with $0 < \alpha < 1$.

* * * * *

UNITED STATES PATENT AND TRADEMARK OFFICE
CERTIFICATE OF CORRECTION

PATENT NO. : 7,082,229 B2  Page 1 of 1
APPLICATION NO. : 10/469809
DATED : July 25, 2006
INVENTOR(S) : Galtarossa et al.

It is certified that error appears in the above-identified patent and that said Letters Patent is hereby corrected as shown below:

In Column 4, Line 55, in Claim 12, delete "0<β1." and insert -- 0<β<1. --, therefor.

Signed and Sealed this

Tenth Day of February, 2009

JOHN DOLL
*Acting Director of the United States Patent and Trademark Office*